United States Patent [19]

Romeike et al.

[11] Patent Number: 4,547,932
[45] Date of Patent: Oct. 22, 1985

[54] PROCESS AND APPARATUS FOR SHIRRING TUBULAR CASINGS

[75] Inventors: Arno Romeike, Taunusstein; Richard Regner, Mainz-Bretzenheim; Alois Weinheimer, Alzey, all of Fed. Rep. of Germany

[73] Assignee: Hoechst Aktiengesellschaft, Frankfurt am Main, Fed. Rep. of Germany

[21] Appl. No.: 621,186

[22] Filed: Jun. 15, 1984

[30] Foreign Application Priority Data

Jun. 20, 1983 [DE] Fed. Rep. of Germany ....... 3322105

[51] Int. Cl.⁴ .............................................. A22C 13/02
[52] U.S. Cl. .......................................... 17/45; 17/1 R; 17/42
[58] Field of Search ...................... 17/45, 41, 1 R, 49

[56] References Cited

U.S. PATENT DOCUMENTS

| | | | |
|---|---|---|---|
| 3,112,517 | 12/1963 | Ives | 17/42 |
| 3,209,398 | 10/1965 | Ziolko | 17/42 |
| 3,619,854 | 11/1971 | Ilgen et al. | 17/42 |
| 3,988,804 | 11/1976 | Regner et al. | 17/45 |
| 4,185,358 | 1/1980 | Regber et al. | 17/42 |
| 4,358,873 | 11/1982 | Kollross | 17/33 |
| 4,359,806 | 11/1982 | Kollross | 17/1 R |

FOREIGN PATENT DOCUMENTS 2132279 2/1972 Fed. Rep. of Germany .
1539366 8/1968 France .
0050161 4/1982 United Kingdom .

Primary Examiner—Willie G. Abercrombie
Attorney, Agent, or Firm—Schwartz, Jeffery, Schwaab, Mack, Blumenthal & Evans

[57] ABSTRACT

Disclosed is a process for shirring tubular casings, in particular sausage casings, in which the casing is conveyed in the direction of its longitudinal axis and shirred against a counterforce by means of a shirring tool. The shirred tubing portion is divided into individual shirred sticks of a predetermined length and, if appropriate, the cut-off shirred sticks are further compressed. While being shirred and in the shirred state the casing is internally supported. For cutting-off a shirred tubing portion, the transport of the casing in the direction of its longitudinal axis is momentarily interrupted, the internal support is withdrawn from the severing region, and the unshirred or deshirred tubing section is severed at the rear aperture of the shirring tool. During severing, the not-yet-shirred casing surrounded by the shirring tool is permanently internally supported. The apparatus for performing the process comprises a shirring mandrel composed of two mandrel members disposed within the tubular casing which, during the transport of the casing, are brought into flush contact. The second mandrel member, seen in the direction of shirring, may be exchanged for at least one further mandrel member.

18 Claims, 7 Drawing Figures

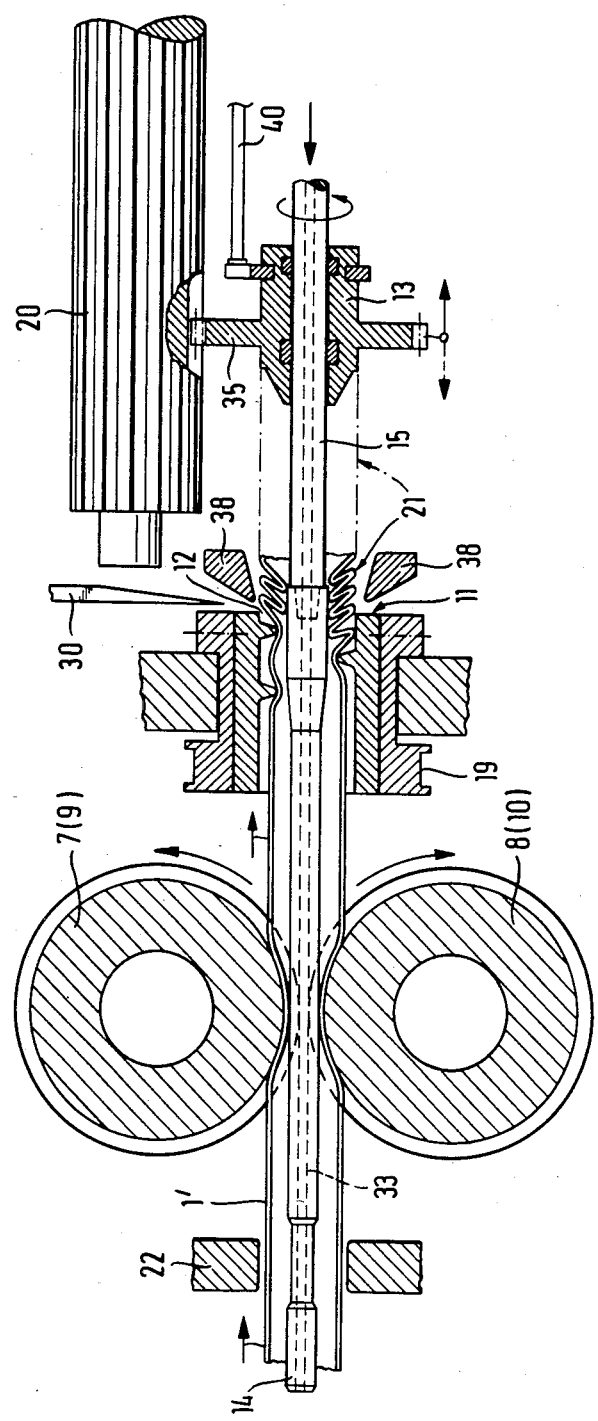

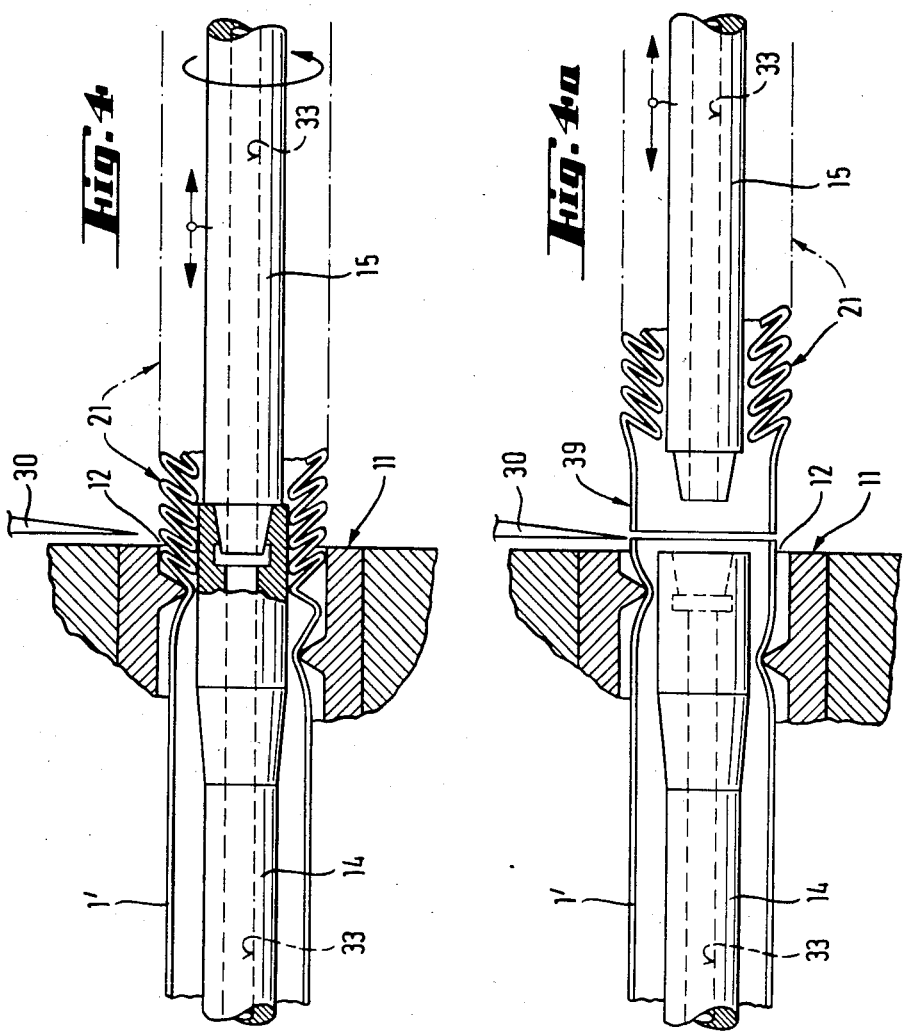

PROCESS AND APPARATUS FOR SHIRRING TUBULAR CASINGS

BACKGROUND OF THE INVENTION

The present invention relates to a process for shirring tubular casings, in particular sausage casings, in which the casing is conveyed in the direction of its longitudinal axis, folds are formed in a shirring area under the action of a shirring force, and the casing leaves the shirring area as a shirred casing portion. At least the casing portion present in the shirring area and the shirred tubing portion are continuously internally supported so that shirring occurs in the inflated state. When the shirred tubing has reached a predetermined length, the transport of the casing is momentarily interrupted, the internal support is removed from the severing region which follows the shirring region, and the length of shirred casing is severed in the severing region and removed. The severed portion of shirred tubing is called a shirred stick.

The invention also relates to an apparatus for performing the above-described process. Known apparatuses for shirring tubular casings essentially comprise a shirring mandrel which is located in the interior of the casing to be shirred; conveying elements for moving the casing supplied from the free end of the shirring mandrel in the inflated state over the shirring mandrel; a shirring tool which acts on the outer circumference of the tubing and through which the shirring mandrel, supporting the casing from inside, extends; and a severing tool, by which the shirred sticks are cut off after reaching a predetermined length.

If, however, self-supporting shirred sticks are to be produced, which is usually the case, the tubular casing must be very densely shirred. The apparatuses then require an abutment which presents a counterforce to the shirring force and which simultaneously allows for an advance movement of the shirred tubing portion.

U.S. Pat. No. 4,359,806, for example, discloses the use of an abutment in the form of a stop which is arranged on the shirring mandrel in such a way that it can be shifted along the longitudinal axis of the mandrel, so that during the formation of the shirred stick the abutment can perform a controlled backward-directed movement. In this apparatus, the shirring mandrel is comprised of one single piece. In the working position, it must extend through the whole stirring tool, which means that before a shirred stick can be cut off, it has to be completely retracted from the shirring tool, until its end is freely positioned in front of the shirring tool.

In order to cut off and remove a shirred stick from the unshirred tubing portion, it is furthermore necessary, using this apparatus, first to stop the shirring tool before the shirring mandrel can be axially removed therefrom, in the direction of shirring. After cutting off the casing and pivoting away the shirring mandrel carrying the just formed shirred stick, an empty shirring mandrel is inserted into the shirring tool, in a direction opposite to the direction of shirring. Only then can the shirring tool be turned on again. Even though the axial path of travel of the shirring mandrel is relatively short, there are long dead travel times between the individual shirring operations, due to the alternating acceleration and slow-down of the shirring tool.

It is impossible, however, to continue the rotation of the shirring tool while the shirring mandrel is withdrawn. In this state, the tubing material is no longer internally supported and therefore would be squeezed by the strong mechanical stress caused by the shirring tool. It would also be difficult to push the shirring mandrel into the squeezed tubing material.

Yet another disadvantage of this apparatus resides in the fact that an exact centering of the shirring mandrel within the shirred tubing portion is very difficult during the formation of the shirred stick and can only be accomplished by means of rather complicated appliances which moreover impede an easy withdrawal of the shirred stick. Additional technical difficulties may arise because, at the beginning of the shirring process, the profiled rollers intended for centering the shirring mandrel must slide from a counterhold sleeve onto the shirred stick being formed. As a result, the shirring mandrel is horizontally displaced by the profiled rollers due to their circular motion. For this reason, it is not possible to keep the position of the shirring mandrel exact during shirring.

Apparatuses which employ a single, stationary shirring mandrel are also known. With these apparatuses it is difficult, however, to cut the casing neatly.

German Pat. No. 1,295,414 (equivalent to U.S. Pat. No. 3,112,517) discloses an apparatus of this type, wherein severing of the shirred stick from the shirred tubing portion is performed at a distance from the shirring tool and in the direction of shirring, after a stop member intended for exerting a counterforce to the shirring force. Severing is performed by scoring and not by cutting. Over the stripping end of the shirring mandrel, the severed shirred stick is pushed onto an axially extending adjacent receiving mandrel, by means of a special stripping device. The stripping end of the known shirring mandrel is held by clamping jaws which have to be unclamped for stripping off the shirred stick. The receiving mandrels are installed on a turret which rotates stepwise and on which the shirred sticks are compressed and subsequently discharged.

U.S. Pat. No. 3,209,398, discloses an apparatus wherein the shirred stick is pushed onto an axially extending, adjacent transport mandrel by means of a special stripping device and further processed on said transport mandrel.

It is a substantial disadvantage of these known apparatuses that the shirred sticks cannot be cut off neatly, so that the ends of the stick tend to become ragged. Moreover these apparatuses are of rather complicated constructional design. The clamping jaws for the second end of the shirring mandrel according to German Pat. No. 1,295,414 and the stripping devices are difficult to control. Use of these known apparatuses also involves the danger that, in the case of relatively densely shirred sticks, the tubing material is damaged in the process of being pushed from the shirring mandrel onto the transport or receiving mandrel. Yet another disadvantage of these shirring apparatuses resides in the fact that the shirring mandrel cannot rotate about its longitudinal axis or at least a great technical expense would be required to make it rotate. Such a rotary movement would cause the shirred tubing portion to rotate during the shirring process, which would result in particularly densely shirred sticks.

In contrast to the previously mentioned apparatuses, the sausage stuffing machine disclosed in U.S. Pat. No. 4,358,873 comprises a shirring unit wherein the shirring mandrel includes two mandrel members which during the shirring process can be engaged in straight alignment. After completion of a shirred tubing portion, the second mandrel member, seen in the direction of shirring, is axially displaced, and the shirred tubing portion is cut off and pivoted away on the second mandrel member, which is then replaced by an empty mandrel member.

This unit is, however, even less suitable to produce densely shirred, self-supporting sticks which are resistant to bending than are the apparatuses described in the previously mentioned publications. For example, it does not possess any elements by which the folded casing could be further compressed. Moreover the cavity of the shirred tubing obtained exhibits neither a uniform diameter nor a smooth internal wall, because the air supply device for inflating the tubular casing is installed outside the shirring mandrel and extends through the shirring tool.

Furthermore, this unit is not intended to produce very densely shirred sticks. The resulting shirred tubing portions are not to be sold as self-supporting shirred sticks, but are permanently internally supported, and immediately after their preparation they are pushed onto the stuffing horn of a sausage stuffing machine, filled with sausage meat and tied off at predetermined lengths.

SUMMARY OF THE INVENTION

It is therefore an object of the present invention to provide a process for shirring tubular casings which will produce densely shirred self-supporting shirred sticks which are resistant to bending.

It is another object of the present invention to provide a process for producing a shirred tubing which exhibits a uniform diameter and a smooth internal wall.

Still another object of the present invention is to provide an apparatus for shirring tubular casings, wherein continuous rotation of the shirring tool is possible, even when the shirring mandrel is withdrawn.

A further object of the present invention is to provide an apparatus as above, wherein the shirring mandrel is maintained in position during shirring.

Yet another object of the present invention is to provide a shirring apparatus as above, wherein the shirred sticks may be cut off neatly without the use of a complicated device.

In accomplishing the foregoing objects, there has been provided in accordance with one aspect of the present invention, a process for shirring tubular casings comprising the steps of transporting the casing in the direction of its longitudinal axis, forming folds in the casing at a shirring area under the action of a shirring tool, providing continuous non-positive internal support for the casing at least in the shirring area, causing the shirred tubing portion to rotate about its longitudinal axis during the action of the shirring tool, by rotating the internal support, and simultaneously compressing the shirred tubing against a receding counterforce. When the shirred tubing portion reaches a predetermined length, the transport of the casing is interrupted and the internal support is removed from the shirred tubing in a severing area. The shirred tubing portion is then severed and removed from the severing region.

In accordance with another aspect of the present invention, there has been provided an apparatus for shirring and severing shirred portions of tubular casings, comprising a hollow shirring mandrel disposed within a tubular casing comprising first and second mandrel members capable of substantially coaxial alignment, wherein each is provided with a hollow channel. At least one of the mandrel members may be axially displaced from a position of positive or non-positive contact between the two mandrel members, and the two mandrel members can be rotated about their longitudinal axes. The outer circumference of the second mandrel member, in at least the area beyond the contact point, is smaller than the outer circumference of the first mandrel member in the region of the shirring tool. The apparatus additionally comprises a plurality of conveying elements disposed to convey the casing over the shirred mandrel and to maintain alignment of the first mandrel member, means for inflating the casing with air, a shirring tool through which the mandrel extends, disposed such that the rear aperture of the shirring tool is located near the contact point between the first and second mandrel members, and a severing tool disposed immediately beyond the shirring tool as seen in the direction of shirring. At least one additional mandrel member is also provided, which is substantially the same as the second mandrel member, and which can be exchanged therefor. Means for rotating the second mandrel member, as well as an abutment member disposed to permit an advancing movement of the shirred tubing portion are also included in the apparatus of the present invention.

Further objects, features and advantages of the present invention will become apparent from the detailed description of preferred embodiments which follows, when considered together with the attached figures of drawing.

BRIEF DESCRIPTION OF THE DRAWINGS

In the drawings:

FIGS. 3, 3a show a side view of the essential parts of another embodiment of the invention; and FIGS. 4, 4a show a side view of the cutting area of the embodiment according to FIG. 1 on an enlarged scale.

DETAILED DESCRIPTION OF PREFERRED EMBODIMENTS

Figure 1:
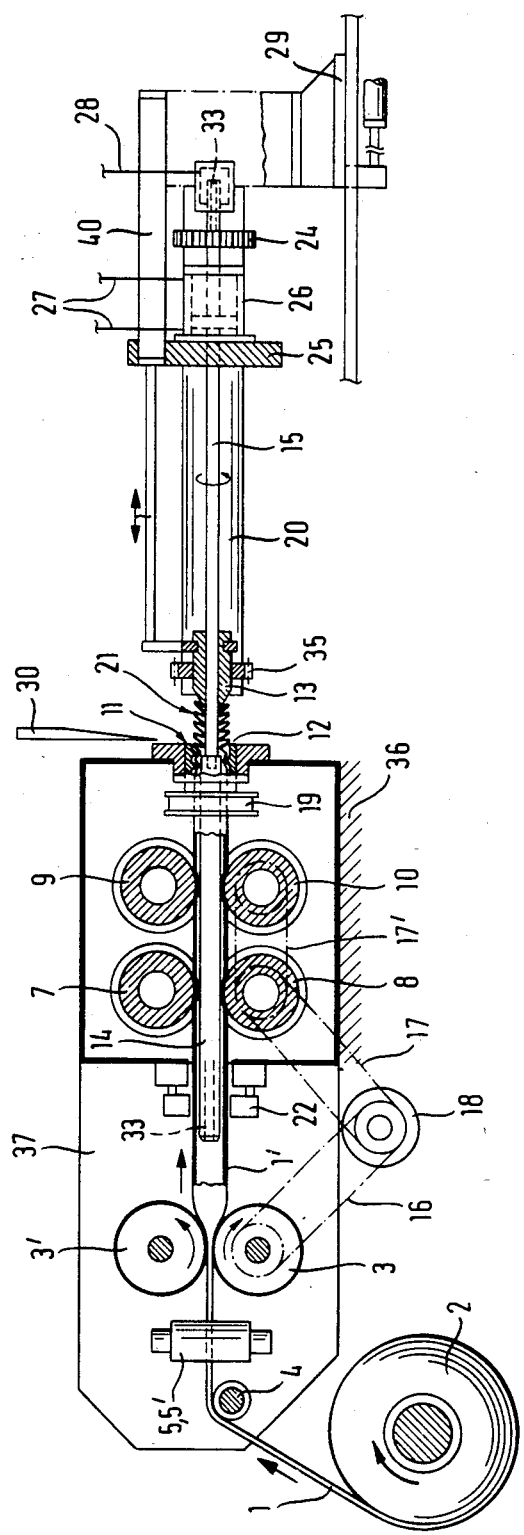
FIGS. 1, 1a show a side view of one embodiment of the invention.

There has been provided in accordance with the present invention a process and apparatus of the general type described in U.S. Pat. No. 4,358,873 and improved such that the process can be performed in a less complicated manner. Furthermore, the apparatus is of a simpler constructional design, although the shirring mandrel is able to rotate. The shirred sticks obtained are densely shirred, self-supporting, and resistant to bending.

In addition, the apparatus according to the present invention requires less dead time between the individual shirring processes. In spite of the faster operational cycles, this apparatus allows for a gentle treatment of the tubing material. Furthermore, it is possible to separate the shirred sticks from the tubing by means of a clean cut.

According to the present invention, the shirred tubing portion can be severed off without problems and gently conveyed away from the shirring mandrel, on which the shirred stick is seated in partly non-positive contact, for example, to a station where further compression takes place. Thus, the shirred stick can be more densely compressed immediately after the shirring process, so that higher production speeds are possible using this apparatus. The apparatus is of relatively simple construction, and various drive and control units required in customary apparatuses are no longer necessary.

The tubular casing is made of the materials conventionally employed for food casings, in particular sausage casings, such as cellulose which may optionally be fiber-reinforced, for example, with a paper insert. The internal and/or external surfaces of the casing can be provided with known coatings, such as are in particular used in sausage production, depending on the individual types of sausage.

According to the process of the present invention, the casing is conveyed in a customary manner in the direction of its longitudinal axis and is shirred in the inflated state by means of a shirring tool against a receding counterforce, until a predetermined length is reached. Seen in the direction of shirring, the shirred tubing portion is seated at the second end of the first mandrel member, which is located in the shirring area, and optionally also at the first end of the second mandrel member, which is located outside the shirring area. A non-positive contact exists between the shirred casing and the mandrel and the shirred casing is internally supported in this way. At a distance from the shirring tool, the shirred tubing portion is internally supported such that there exists only a relatively loose contact between the shirred tubing portion and the internal support. This loose support is effected by the second mandrel member. During shirring, the shirred tubing portion is continuously internally supported.

When the shirred tubing portion has reached a certain, predetermined length, the conveyance of the casing is interrupted for a short time and the internal support of the casing is displaced a short distance in the direction of shirring from the shirring tool. In this process step, the second mandrel member is axially shifted in the direction of shirring, and optionally the first mandrel member is also shifted, but in the opposite direction. The contact point, where the two mandrel members contact each other, is located close to the end of the shirring tool, seen in the direction of shirring. By the motion of the mandrel members, a short section of the shirred tubing portion is pulled apart again, i.e., is deshirred in the area of the contact point. This deshirred tubing portion, which is no longer supported from inside, is severed, optimally by cutting. While being removed from the shirring area, the cut-off shirred stick is supported by the same internal supporting means which is used as a support during the subsequent further compression. This subsequent compression of the shirred stick may take place in several stages, until the desired degree of density is reached.

During the whole process the tubular casing is internally supported by the first mandrel member in the shirring area. Due to this permanent internal support of the not yet shirred tubing portion, the shirring tool can always be moved, even during cutting, and the dead times between the actual shirring steps, where the tubing is folded, are reduced.

It is another important characteristic of the process of this invention that, as a result of the rotation of the internal support which is in non-positive contact with the shirred tubing portion, this shirred tubing portion is caused to rotate about its longitudinal axis during the action of the shirring force. Thus, the casing simultaneously describes a forward movement in the direction of its longitudinal axis and a rotary movement.

The shirred casing can be particularly densely compressed when the shirring force acting upon the rotating casing also describes a rotary movement. In this process variant, the shirring force is applied by at least one tool which rotates about the longitudinal axis of the tubular casing. Shirring of the tubular casing is then performed while the tubular casing is compressed in the direction of its longitudinal axis, against a receding counterforce. This results in the formation of a main fold running helically about the longitudinaly axis of the shirred stick. In addition, a high shirring ratio and resistance to buckling of the shirred stick are achieved in this way.

During the shirring process, the tool used for shirring is in permanent non-positive connection with the tubular casing and transmits the compressive force required to form a stiff shirred stick to the tubular casing. Prior to the actual shirring process, the casing to be shirred is optimally provided with an indentation in the form of an exact, continuous helical line, as suggested in accordance with the process of U.S. Pat. No. 3,988,804. In accordance with the instant invention, the casing is caused to rotate, in addition to the rotating shirring force as described above. Surprisingly, it has been found that an extraordinarily densely compressed, stiff shirred casing is obtained in those areas where the tool used to apply the shirring force rotates in a direction opposite to that of the shirred tubing portion.

The apparatus of the present invention comprises a functionally uniform shirring mandrel which comprises two mandrel sections or mandrel members wherein the first mandrel section does not substantially project beyond the shirring tool. The second mandrel section adjoins the first mandrel section in the area of the shirring tool. Surprisingly, the second end of the first mandrel section, i.e., the end representing the contact point to the second mandrel section, does not require a support, which would hinder the removal of the shirred sticks. Instead, it is supported by the second mandrel section which is coaxially engaging the first mandrel section, and, to a greater extent, by the conveying elements provided at the free first end of the first mandrel section. In this way it is kept in its fixed, central position during shirring. The conveying elements are, for example, pairs of rollers which engage the circumference of the first mandrel section, through the inflated casing.

When the shirred portion of casing has reached a predetermined length, the drive mechanism of the conveying elements is stopped. At the same time, the shirring mandrel is split into its two sections by removing the second mandrel member, i.e., the second section of the mandrel seen in the direction of shirring. The second mandrel member is moved along the longitudinal axis in the direction of shirring, and a travel path of less than about 5 cm is generally sufficient to create a passage for a severing tool. Furthermore, the travel path is selected such that the length of casing which is deshirred again in the severing region is just sufficient to enable the shirred casing in the deshirred portion to be cut off.

Deshirring of the tubing portion in the severing region is either performed by moving the mandrel members in opposite directions along the longitudinal axis, whereby the shirring folds are pulled apart, and/or by means of tong-type tools which grip the casing from the outside. The shifting of the second mandrel member in the direction of travel along the longitudinal axis makes it also possible to remove the second mandrel member carrying the severed shirred stick from the shirring region and, if appropriate, to convey it to a compressing station.

This movement of the second mandrel member in the direction of the longitudinal axis is effected in a known manner. For example, a turret head or turret plate, on which further mandrel sections or members are arranged in parallel alignment, may be provided which can be shifted in the direction of shirring by the travel path mentioned above. Immediately after cutting off a length of shirred casing, one of these empty mandrel sections is substituted for the second mandrel section carrying the shirred stick.

A severing tool, for example, a knife, divides the shirred casing with a clean cut in the interspace between the two separated shirring mandrel sections. The turret head may be rotated about an axis of rotation running parallel to the shirring mandrel in those cases where the further mandrel members are aligned parallel to each other and the shirring mandrel. Alternatively, the turret head may be rotated about a vertical axis of rotation in those embodiments where the additional mandrel units are arranged radially about the axis of rotation. In both embodiments, rotation of the turret brings the next, empty mandrel member into a coaxial position relative to the first mandrel member and the empty mandrel is forced into flush engagement with the latter, by shifting it along the longitudinal axis, in a direction opposed to the direction of shirring. This next mandrel member is now the new second mandrel member and together with the first mandrel member forms the complete shirring mandrel. Joining of the two mandrel members to form the shirring mandrel is carried out outside the shirring area and can be performed by a simple process.

When the complete shirring mandrel has been formed again in this way, the conveying elements are started again and the tubular casing is conveyed in the direction of the shirring tool.

It was surprising to find that during the interruption of the drive of the conveying elements the shirring tool can be kept running without there being any danger of the rotating shirring tool damaging the tubing material. Due to the fact that the shirred stick has been cut off, the air present in the unshirred tubing portion escapes, and the shirring tool is no longer able to grip the circumference of the deflated casing. Additionally, damaging of the casing by the shirring tool is prevented by the first mandrel section which remains in the shirring area and permanently supports the casing from inside, even during this interruption. As a result of the continuous rotation of the shirring tool, the time- and energy-consuming acceleration and slowing-down of the shirring tool usually required at the start and end of the production of each shirred stick can be omitted.

The shirring mandrel is a hollow pipe comprised of two component parts constituted by the two mandrel members. The air required for inflating the tubing is blown in through the second end of the second mandrel member and blown out through the first end of the first mandrel member, in order to keep the casing in an inflated state.

In accordance with the present invention, the outer circumference in the shirring area of the first mandrel member determines the diameter of the interal hollow space of the shirred casing, hence, this outer circumference must be appropriately selected. The second mandrel, in the region following the severing point where the shirred length of tubing is cut off, has a smaller diameter. The shirring folds of the tubular casing, which are produced by the shirring tool, are pressed against the abutment by the shirring force exerted by the shirring tool and thus compressed. Usually they are also tightly pressed against the outer circumference of the shirring mandrel in the shirring region. As a consequence thereof, the shirred tubing portion seats relatively firmly on the shirring mandrel in the shirring area, which is called a non-positive contact. Because of the reduced circumference of the shirring mandrel in the subsequent region of the second mandrel member, there exists only a loose contact between the second mandrel member and the shirred tubing portion. As a result, the cut-off shirred stick can be easily removed from the second mandrel member in a later process step.

The shirring tool comprises customary components, such as, for example, a plurality of grooved shirring wheels performing an eccentric motion, or a rotating sleeve-type element, the inner wall of which is provided with a helical projection, as is described in U.S. Pat. No. 4,185,358. No particular adaptation of the shirring tool is necessary to meet the requirements of the instant invention.

The abutment is movable along the longitudinal axis of the second mandrel member and recedes in the direction of shirring, as the length of the shirred stick increases. It is designed as a stop member or a sleeve which surrounds the second mandrel member like a ring. Movement of the abutment along the longitudinal axis is, for example, performed by means of a hydraulic cylinder. Each further mandrel member intended to replace the second mandrel member carries such an abutment.

It is another essential characteristic of the present invention that the second mandrel member can rotate about its longitudinal axis. The drive elements required for this purpose are, for example, located in the area of the turret plate. Due to the contact between the two mandrel members, the first mandrel member is entrained by the rotary movement of the second mandrel member. For this purpose, a positive or non-positive connection of the two mandrel members is required. A non-positive connection is, for example, achieved by mutual coupling by means of cones. As a result of the non-positive contact between the first mandrel member and the shirred portion of the casing, the shirred casing is caused to rotate, in the area of the shirring tool, by the rotary movement of the two mandrel members. Thus, the casing simultaneously performs an advance movement in the direction of the longitudinal axis and a rotary movement. This means that the shirring tool acting upon the outer surface of the casing, seizes helically offset surface areas of the casing, whereby a particularly dense compression of the shirred casing is achieved. This effect is further increased in a preferred embodiment where the shirring tool, in particular the above-mentioned sleeve-type element, is caused to rotate in a direction opposed to the direction of rotation of the shirring mandrel. Thus, the already shirred tubing portion seating on the shirring mandrel is entrained by the shirring mandrel, preferably in a direction opposed to the direction of movement of the sleeve-type shirring tool.

Figure 1A:
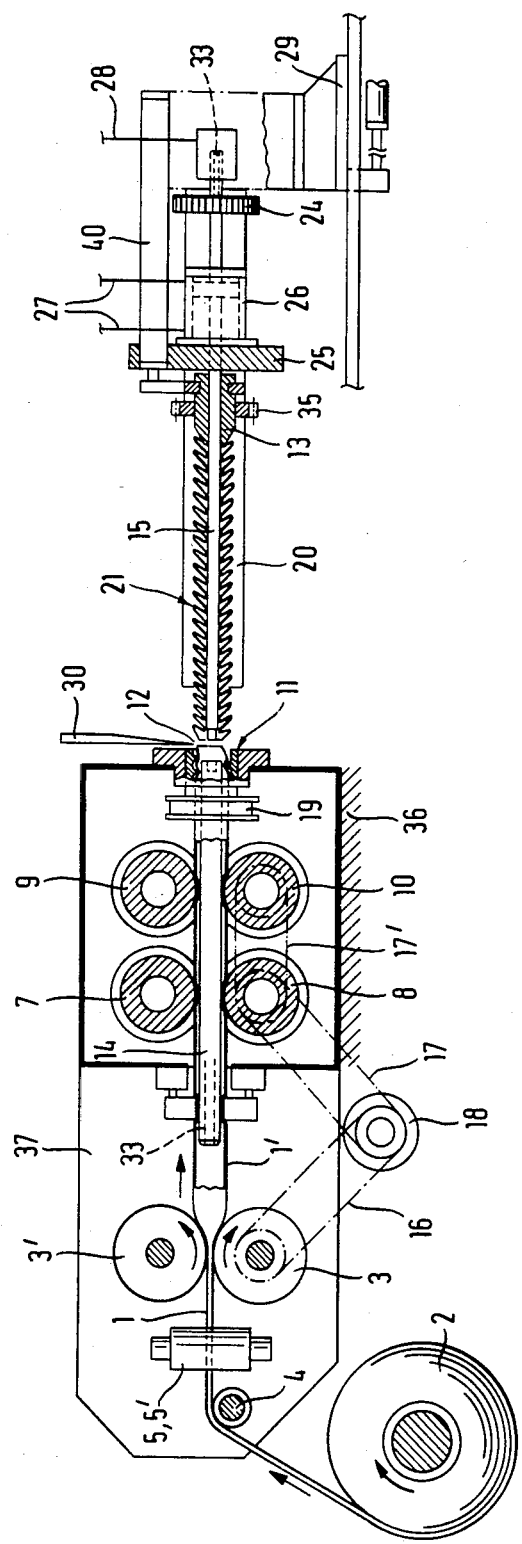

In FIGS. 1, 1a, the flat tubular casing 1 is unwound from the reel 2 and is conveyed over guide rollers 4, 5, 5' by driven squeeze rollers 3, 3'. In the subsequently arranged shirring and conveying wheel group, the inflated casing 1' is moved in the direction of shirring by the conveying wheels 7, 8, 9, 10 and shirred against an annular sleeve 13, by means of the shirring tool 11 which is described in greater detail by U.S. Pat. No. 4,185,358.

The shirring mandrel is composed of two parts, a leading first mandrel member 14 and a rear second mandrel member 15, which in FIG. 1 are linked at the contact point and in FIG. 1a are pulled apart by shifting the mandrel member 15 axially to the right. The first mandrel member 14 ends in the area of the rear aperture 12 of the shirring tool 11. It is also possible to shift the first mandrel member, in a direction opposed to the direction of shirring, as soon as the shirred stick 21 has reached the desired length. Shifting is then achieved by means of tongs 22 by which the mandrel member 14, together with the casing 1', is gripped and axially shifted.

The squeeze rollers 3, 3' are connected to the driving motor 18 by means of the cogged V-belt 16, and the conveying wheels 7, 8, 9, 10 are connected to the driving motor 18 by means of the cogged V-belts 17, 17'.

The shirring tool 11 is driven by the pulley 19 which is caused to rotate about the longitudinal axis of the mandrel members 14, 15. For reasons of clarity, the driving belt and driving motor of pulley 19 are not shown in the drawings.

As the length of the shirred stick 21 increases, the sleeve 13 is shifted by the hydraulic cylinder 40 along the second mandrel member 15, in the direction of the shirring, until the shirred stick 21 has reached its predetermined length, as shown in FIG. 1a. Reference numeral 23 denotes the rotary drive of the pinion shaft 20, reference numeral 24 denotes the toothed wheel for rotating the second mandrel member 15, and reference numeral 35 denotes the toothed wheel for rotating the sleeve 13. The toothed wheels 24 and 35 are driven by the pinion shaft 20. Thus, synchronous rotation of the second mandrel member 15 and the sleeve 13 is ensured.

The second mandrel member 15 is located in a turret plate 25. At the beginning of the shirring process, this second mandrel member 15 is axially pushed into the rear end of the first mandrel member 14, by means of the cylinder 26 which is connected to a hydraulic line or compressed air line 27. When the shirred stick 21 has reached its desired length, it is axially withdrawn again from the first mandrel member 14. Air is blown via the compressed air line 28 through hollow channel 33 provided in the interior of the two mandrel members 14, 15, to ensure that the casing 1' between the squeeze rollers 3, 3' and the shirring tool 11 is maintained in an inflated state.

The turret plate 25 can be shifted in a direction parallel to the shirring mandrel by means of the slide 29, so that the mandrel member 15 be axially shifted not only by the cylinder 26, but also by the motion of the turret plate 25.

Figure 2:
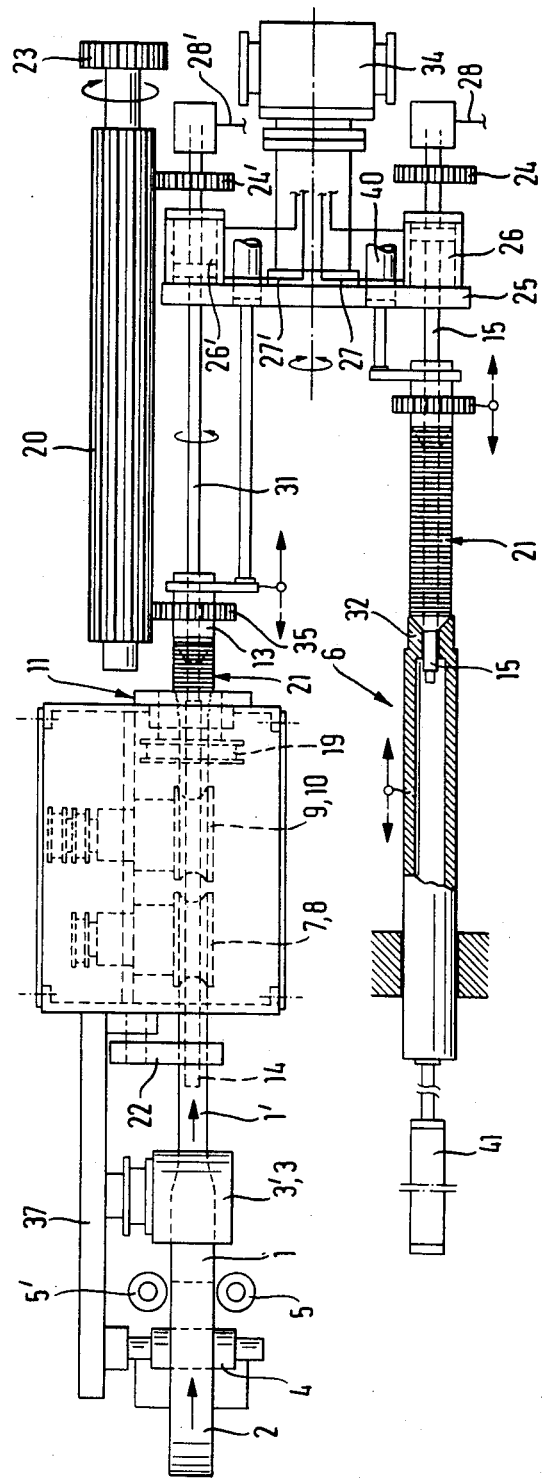
FIG. 2 shows a top view of the embodiment shown in FIG. 1.

As shown in FIG. 1a, as soon as the shirred stick has reached the desired length and the two mandrel members 14, 15 are separated, the casing 1' is severed by means of knife 30. Then the turret plate 25 (FIG. 2) is rotated by means of the swivelling element 34, through an angle of, for example 180°, and, as shown in FIG. 2, another prepared mandrel member 31 is brought into straight alignment with the first mandrel member 14. The mandrel member 15 carrying the shirred stick 21 can be pressed against a stop 32 in the compressing station 6, for example, by means of a hydraulic cylinder 40. Thus, a further compression of the shirred stick is achieved. After removing the stop 32, for example, axially by means of a hydraulic cylinder 41, the shirred stick is removed from the mandrel member 15 with the aid of the sleeve 13 and is now ready for further processing. Reference numerals 24', 26', 27' and 28' denote component parts which are identical to component parts 24, 26, 27 and 28, but are related to mandrel member 31. Reference numeral 36 denotes the machine housing, and reference numeral 37 denotes a lateral wall.

Figure 3A:
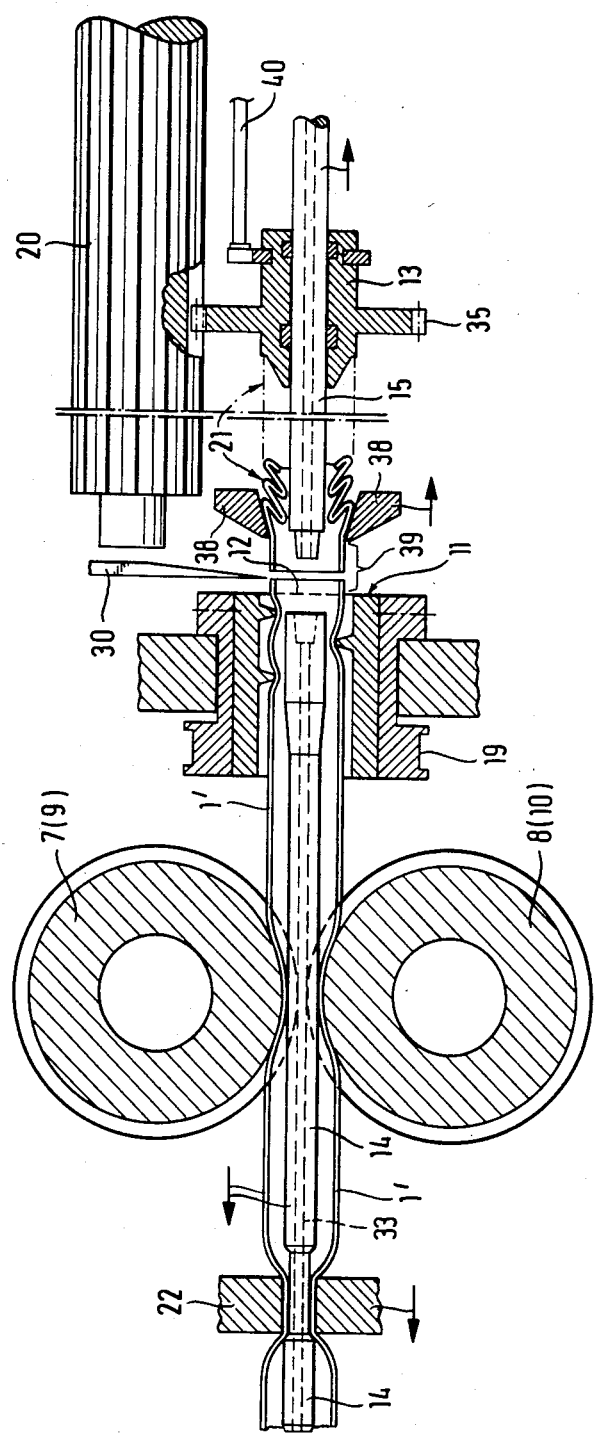

FIGS. 3 and 3a show a variant of the apparatus, in which the first mandrel member 14 ends at the rear aperture 12 of the shirring tool, but protrudes slightly from said aperture 12 of the shirring tool 11, in the direction of shirring. Shirring is performed against the sleeve 13, which is movably mounted on the second mandrel member 15 and can be shifted with the aid of the hydraulic cylinder 40. When the shirred stick 21 has reached the desired length, a short section 39 of the shirred stick 21 is deshirred by means of the elastic tongs 38, as shown in FIG. 3a. The mandrel member 14 is moved in a direction opposite to the direction of shirring, by means of the tongs 22 and/or the conveying wheels 7, 8, 9, 10. The mandrel member 15 is withdrawn in the direction of shirring, as shown in FIG. 1. With a knife 30, which is introduced into the interspace formed between the two separated mandrel members 14 and 15, the shirred stick 21 is cut through in the deshirred section 39.

FIGS. 4 and 4a show enlarged views of the cutting area of FIG. 1. FIG. 4 shows the appliance during shirring, and FIG. 4a shows the appliance immediately after severing the casing, with the mandrel members 14 and 15 pulled apart. The reference numerals denote the same items as in FIG. 1.

What is claimed is:

1. A process for shirring tubular casings, comprising the steps of:
   (a) transporting the casing in the direction of its longitudinal axis;
   (b) forming folds in the casing at a shirring area by means of a shirring tool;
   (c) providing continuous non-positive internal support for the casing at least in the shirring area;
   (d) causing the shirred tubing portion to rotate about its longitudinal axis during the action of the shirring force, by rotating the internal support;
   (e) simultaneously compressing the shirred tubing against a receding counterforce;
   (f) interrupting transport of the casing when the shirred tubing portion reaches a predetermined length;
   (g) removing the internal support from the shirred tubing in a severing area; and thereafter
   (h) severing the shirred tubing portion and removing it from the severing region.

2. A process as claimed in claim 1, wherein the receding counterforce rotates about the longitudinal axis of the shirred tubing portion in the same direction as the internal non-positive support.

3. A process as claimed in claim 2, wherein the receding counterforce rotates at substantially the same speed as the internal support.

4. A process as claimed in claim 1, wherein the rotation of the shirring tool is continuous.

5. A process as claimed in claim 1, wherein the shirring force is applied by an element which rotates about the longitudinal axis of the casing, and is in non-positive contact with the casing.

6. A process as claimed in claim 5, wherein the shirring element and the shirred casing rotate in opposite directions.

7. A process according to claim 1, further comprising a step wherein the severed shirred stick is subjected to additional axial compression.

8. An apparatus for shirring and severing shirred portions of tubular casings, comprising:

(a) a hollow shirring mandrel adapted to be disposed within a tubular casing, comprising first and second mandrel members capable of substantially coaxial alignment, wherein each is provided with a hollow channel, at least one of the mandrel members may be axially displaced from a position of positive or non-positive contact between the two mandrel members and the two mandrel members can be rotated about their longitudinal axes, and wherein the outer circumference of the second mandrel member, in at least the area beyond the contact point, is smaller than the outer circumference of the first mandrel member in the region of the shirring tool;

(b) a plurality of conveying elements disposed to convey the asing over the shirring mandrel and to maintain alignment of the first mandrel member;

(c) means for inflating the casing with air;

(d) a shirring tool through which the mandrel extends, disposed such that the rear aperture of the shirring tool is located near the contact point between the first and second mandrel members, (e) a severing tool disposed immediately beyond the shirring tool as seen in the direction of shirring;

(f) at least one additional mandrel member, which is substantially the same as the second mandrel member, and which can be exchanged therefor;

(g) means for rotating the second mandrel member; and (h) an abutment member disposed to permit an advancing movement of the shirred tubing portion.

9. An apparatus as claimed in claim 8, wherein the first mandrel member is held in position only by conveying elements which are installed in front of the shirring tool, seen in the direction of shirring.

10. An apparatus as claimed in claim 8, wherein the first and second mandrel members can be axially displaced in opposite directions, in order to separate them from each other.

11. An apparatus as claimed in claim 8, further comprising a movably mounted turret assembly, on which the second mandrel member and at least one further mandrel member are disposed, wherein the turret assembly may be moved to sequentially exchange the at least one further mandrel member for the second mandrel member.

12. A turrent assembly as claimed in claim 11, further comprising means for displacing each of the mandrels disposed thereon along their longitudinal axes.

13. An apparatus as claimed in claim 8, further comprising a compressing station for compressing the severed shirred stick.

14. An apparatus as claimed in claim 8, wherein the means for rotatably driving the second mandrel member is designed such that it simultaneously ensures a synchronous drive of the abutment member.

15. An apparatus as claimed in claim 8, wherein the means for inflating the casing with air is disposed at the far end of the second mandrel member as seen in the direction of shirring and is designed such that air is introduced into the hollow channel of the second mandrel member.

16. An apparatus as claimed in claim 8, wherein the shirring tool comprises a sleeve-type element, which surrounds and can be caused to rotate about the tubular casing.

17. An apparatus as claimed in claim 16, wherein the shirring tool is designed to rotate in the opposite direction to the rotation of the mandrel members.

18. An apparatus as claimed in claim 8, wherein the abutment member comprises an annular sleeve coaxially disposed about the second mandrel member and is moveable along the longitudinal axis thereof.

* * * * *